(12) United States Patent
Yuasa et al.

(10) Patent No.: US 8,967,709 B2
(45) Date of Patent: Mar. 3, 2015

(54) VEHICLE SUNROOF APPARATUS

(71) Applicant: Aisin Seiki Kabushiki Kaisha, Kariya-shi, Aichi-ken (JP)

(72) Inventors: Daisuke Yuasa, Toyoake (JP); Takashi Kikuta, Kariya (JP); Nobuyasu Bessho, Toyota (JP); Takashi Kawato, Anjo (JP); Masato Saita, Nantong Jiangsu (CN)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/091,499

(22) Filed: Nov. 27, 2013

(65) Prior Publication Data
US 2014/0145473 A1   May 29, 2014

(30) Foreign Application Priority Data

Nov. 27, 2012  (JP) ................. 2012-258922

(51) Int. Cl.
*B60J 7/057*  (2006.01)
*B60J 7/043*  (2006.01)

(52) U.S. Cl.
CPC ............... *B60J 7/057* (2013.01); *B60J 7/0573* (2013.01); *B60J 7/0435* (2013.01)
USPC .................. 296/223; 296/216.03; 296/216.05

(58) Field of Classification Search
CPC ............................. B60J 7/0435; B60J 7/0573
USPC ............................................ 296/216.01–224
See application file for complete search history.

(56) References Cited

U.S. PATENT DOCUMENTS

| | | | |
|---|---|---|---|
| 6,617,812 B2 * | 9/2003 | Nagashima et al. | ......... 318/280 |
| 2003/0052636 A1 | 3/2003 | Okada et al. | |
| 2008/0238154 A1 | 10/2008 | Honjo et al. | |
| 2012/0001458 A1 | 1/2012 | Sawada | |
| 2013/0147237 A1 | 6/2013 | Sawada | |
| 2013/0264845 A1 | 10/2013 | Katsura et al. | |

FOREIGN PATENT DOCUMENTS

| | | |
|---|---|---|
| JP | 2003-3739 | 1/2003 |
| JP | 2009-228254 | 10/2009 |
| JP | 2010-254180 | 11/2010 |

OTHER PUBLICATIONS

Extended European Search Report for European Appl. No. 13194310.2 dated Apr. 3, 2014.
U.S. Appl. No. 13/776,979, filed Feb. 26, 2013.

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A vehicle sunroof apparatus includes: a pair of first and second opening and closing drive units provided in a widthwise direction, the pair of first and second opening and closing drive units each including: a rail extending in a fore-and-aft direction of a vehicle; a movable body provided so as to be movable on the rail; and a coupling mechanism configured to couple the movable body to a movable panel provided in a roof opening portion, and arranged at widthwise both end portions of the roof opening portion so as to be capable of opening and closing the movable panel; and a control device configured to control operations of the opening and closing drive units.

7 Claims, 9 Drawing Sheets

VEHICLE SUNROOF APPARATUS

CROSS REFERENCE TO RELATED APPLICATIONS

This application is based on and claims priority under 35 U.S.C. §119 to Japanese Patent Application 2012-258922, filed on Nov. 27, 2012, the entire content of which is incorporated herein by reference.

TECHNICAL FIELD

This disclosure relates to a vehicle sunroof apparatus.

BACKGROUND DISCUSSION

In the related art, there is a vehicle sunroof apparatus configured to allow a movable panel provided in a roof opening portion to be opened and closed. For example, a sunroof apparatus disclosed in Japanese Patent No. 4858570 (Reference 1) is provided with a pair of left and right opening and closing drive units at widthwise both end portions of the roof opening portion. These opening and closing drive units each include a rail extending in the fore-and-aft direction of a vehicle, a movable body provided so as to be movable on the rail, and a coupling mechanism configured to couple the movable body to the movable panel. The coupling mechanism includes a tilt mechanism configured to tilt the movable panel in accordance with a relative position of the movable body moving on the rail, and a switching mechanism configured to switch the state between a tilting state in which the movable body is relatively movable with respect to the movable panel and a sliding state in which the movable panel moves integrally with the movable body.

Specifically, the tilt mechanism is configured to tilt up the movable panel in a form of lifting a rear end thereof on the basis of a forward movement of the movable body. At a forward position to which the movable panel is tilted up, a switching area in which the coupled state between the movable panel and the movable body is switchable by the switching mechanism is set. The switching mechanism switches the coupled state in the tilting state into the sliding state and switches the coupled state in the sliding state into the tilting state with the movable body moved to the switching area.

In other words, in the sunroof apparatus having the configuration as described above, if the movable panel is in a fully-closed state, the coupled states between the movable panel and the movable bodies of the respective opening and closing drive units are in the tilting state. In this tilting state, a tilting angle of the movable panel (tilt angle), that is, an amount of opening by the tilting operation may be adjusted by moving the movable bodies of the respective opening and closing drive units in the fore-and-aft direction of the vehicle.

The coupled state between the movable bodies and the movable panel is switched from the tilting state to the sliding sate by moving the movable bodies of the respective opening and closing drive units to the switching areas. In this sliding state, the movable panel may be slid along a roof panel, that is, the amount of opening by the sliding operation may be adjusted in a state in which the movable panel is tilted up by moving the movable bodies of the respective opening and closing drive units in the fore-and-aft direction of the vehicle.

Furthermore, in this sliding state, the coupled state between the movable bodies and the movable panel is switched to the tilting state by moving the movable bodies of the respective opening and closing drive units again to the switching areas. Subsequently, the movable panel may be translated to the fully-closed state by moving the movable bodies of the respective opening and closing drive units rearward.

In this configuration, the limited rail length may be effectively used without dividing the rail into a tilting section and a sliding section. Accordingly, larger amounts of opening in a tilted state and in a slid state may be secured and, simultaneously, the movable panel may be opened and closed quickly without increasing the size of a motor, which corresponds to a drive source of the movable panel.

However, in a configuration in which the pair of left and right opening and closing drive units are provided at the widthwise both end portions of the roof opening, there is a case, for example, where misalignment of the positions of the movable bodies may occur between the two opening and closing drive units caused by rattling with respect to the rails. In other words, a state in which the coupled state between the movable body and the movable panel is switched at one of the left and right opening and closing drive units, but the switching of the coupled state is not completed in the other opening and closing drive unit may occur. If the direction of movement of the respective movable bodies is reversed in this state, lodging may occur in the opening and closing drive units by the opening and closing operations of the movable panel on the left side and the right side different from each other. Therefore, from this point, there is still a room for improvement.

SUMMARY

Thus, a need exists for a vehicle sunroof apparatus which is not suspectable to the drawback mentioned above.

A first aspect of this disclosure is directed to a vehicle sunroof apparatus including: a pair of first and second opening and closing drive units provided in a widthwise direction, the pair of first and second opening and closing drive units each including: a rail extending in a fore-and-aft direction of a vehicle; a movable body provided so as to be movable on the rail; and a coupling mechanism configured to couple the movable body to a movable panel provided in a roof opening portion, and arranged at widthwise both end portions of the roof opening portion so as to be capable of opening and closing the movable panel; and a control device configured to control operations of the opening and closing drive units, wherein the coupling mechanism includes a tilt mechanism configured to tilt the movable panel in accordance with a relative position of the movable body moving on the rail, and a switching mechanism configured to switch a state between a tilting state in which the movable body is relatively movable with respect to the movable panel and a sliding state in which the movable panel moves integrally with the movable body, the tilt mechanism is configured to tilt up the movable panel on the basis of a forward movement of the movable body, the switching mechanism is configured to switch a coupled state between the movable body and the movable panel in the tilting state into the sliding state and switch the coupled state in the sliding state into the tilting state with the movable body moved to a switching area set at a forward position where the movable panel is tilted up, and the control device is configured to detect a load variation caused by switching of the coupled state by the forward movement of the movable body in the switching area and control each of the opening and closing drive units no as to move the movable body reversely when the switching of the coupled state is recognized in the first and second opening and closing drive units on the basis of the load variation.

In other words, in a state in which the coupled state between the movable panel and the movable bodies is mechanically switched by the forward movement of the movable bodies in a switching area, a load is applied to the movable bodies moving on the rails when the coupled state is switched. Therefore, in the configuration as described above, the switching of the coupled state may be recognized easily in the opening and closing drive units by a simple configuration. In addition, by moving the movable bodies reversely when the switching of the coupled state is recognized in both of the opening and closing drive units, an occurrence of a situation that the coupled states of the left and right opening and closing drive units become different may be suppressed. Consequently, an occurrence of lodging in the opening and closing drive units is avoided, so that the switching between the tilting state and the sliding state is achieved smoothly.

According to the aspect of this disclosure, the switching between the tilting state and the sliding state is achieved smoothly without an occurrence of lodging in the left and right opening and closing drive units.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be described with reference to the drawings.

Figure 1:
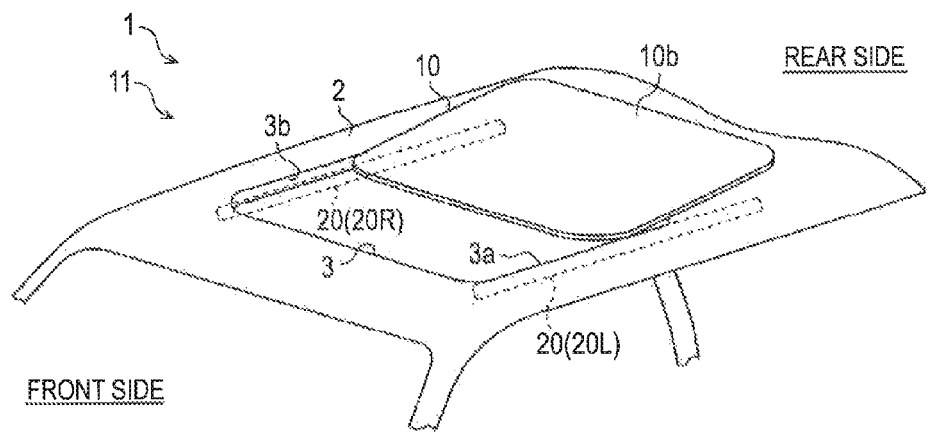
FIG. 1 is a perspective view illustrating a schematic configuration of a sunroof apparatus.

As illustrated in FIG. 1, a roof panel 2 of a vehicle 1 is formed with a substantially rectangular-shaped roof opening portion 3. The roof opening portion 3 is provided with a substantially flat plate-shaped movable panel 10 which is configured to open and close the roof opening portion 3. The vehicle 1 is provided with a sunroof apparatus 11 configured to cause the movable panel 10 to open and close by a motor (not illustrated) as a drive source.

Specifically, the sunroof apparatus 11 of the embodiment disclosed here is provided with a pair of left and right opening and closing drive units 20 (20L and 20R) which cause the movable panel 10 to open and close by being provided at widthwise both end portions 3a and 3b of the roof opening portion 3.

Figure 2A:
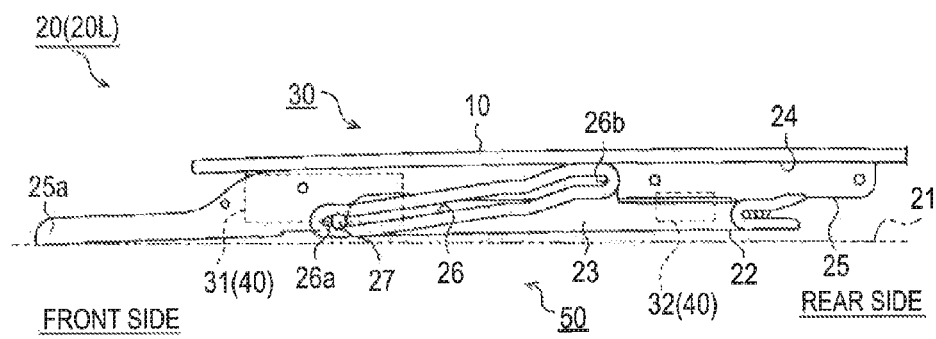
FIGS. 2A and 2B are side views of the opening and closing drive units which constitute the sunroof apparatus.
Figure 2B:
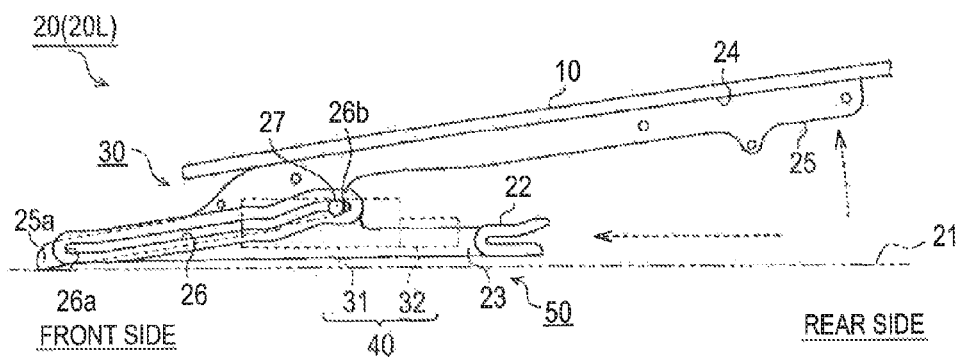

As illustrated in FIGS. 2A and 2B, the opening and closing drive unit 20 of the embodiment disclosed here includes a rail 21 extending in the fore-and-aft direction of the vehicle and a movable body 22 provided so as to be movable on the rail 21. In the embodiment disclosed here, the left and right opening and closing drive units 20L and 20R have the same configuration except for being a widthwise inverted configuration. Therefore, for the sake of convenience of description, only the opening and closing drive unit 20L on the left side is illustrated for description.

The movable body 22 of the embodiment disclosed here includes a side panel portion 23 having an elongated panel shape extending along the rail 21. A rear surface 24 of the movable panel 10 is provided with a supporting bracket 25 extending in the fore-and-aft direction of the vehicle. The opening and closing drive unit 20 of the embodiment disclosed here is configured to cause the movable panel 10 to open and close on the basis of the fore-and-aft movement of the movable body 22 along the rail 21 by coupling the side panel portion 23 of the movable body 22 to the supporting bracket 25 of the movable panel 10.

More specifically, the side panel portion 23 of the movable body 22 is formed with a guide hole 26 extending in the longitudinal direction, that is, in the fore-and-aft direction of the vehicle. The supporting bracket 25 of the movable panel 10 is provided with a guide pin 27 projecting outward in the width direction, thereby being inserted into the guide hole 26 of the movable body 22. The movable body 22 is movable relative to the movable panel 10 within a range of a sliding movement of the guide pin 27 in the guide hole 26 in appearance.

Specifically, the guide hole 26 of the embodiment disclosed here is provided with an inclination so that a rear end portion 26b is arranged at a higher level than a front end portion 26a. The supporting bracket 25 is configured to be slidable on the rail 21 and tiltable about the front end portion 25a as a supporting point by an engagement of the front end portion 25a with the rail 21. Accordingly, in the embodiment disclosed here, a tilt mechanism 30 configured to cause the movable panel 10 to tilt in accordance with the relative position of the movable body 22 which moves on the rail 21 in the fore-and-aft direction is formed.

In other words, as illustrated in FIG. 2A, the movable panel 10 of the embodiment disclosed here is arranged in substantially parallel to the rail 21 of the opening and closing drive unit 20 when being in a fully-closed state in which the roof opening portion 3 is fully closed. At this time, the guide pin 27 inserted into the guide hole 26 of the movable body 22 as described above is arranged at the front end portion 26a of the guide hole 26.

As illustrated in FIG. 2B, the movable body 22 moves on the rail 21 toward the front (left side in FIG. 2B), the guide pin 27 on the movable panel 10 moves within the guide hole 26 of the movable body 22 from the front end portion 26a toward the rear end portion 26b in appearance. Accordingly, a coupled point between the movable panel 10 and the movable body 22 moves upward, so that the movable panel 10 is tilted (tilt-up) in a form that a rear end 10b of the supporting bracket 25 moves upward.

The opening and closing drive unit 20 of the embodiment disclosed here further includes a first coupling member 31 provided on the movable panel 10, and a second coupling member 32 provided on the movable body 22. A relative movement of the movable body 22 with respect to the movable panel 10 is restricted by coupling between the first and second coupling members 31 and 32.

Specifically, in the embodiment disclosed here, the second coupling member 32 is configured to come into contact with the first coupling member 31 provided on the movable panel 10 at a forward position where the movable panel 10 is tilted up by a forward movement of the movable body 22. Also, in the embodiment disclosed here, a range which has a probability that the second coupling member 32 provided on the movable body 22 comes into contact with the first coupling member 31 provided on the movable panel 10 in a tilting state in which the movable body 22 moves relative to the movable panel 10 is set as a "switching area". The first coupling member 31 and the second coupling member 32 are configured to be coupled by the movement of the movable body 22 to the switching area.

In other words, the movable panel 10 moves on the rail 21 integrally with the movable body 22 by restricting the relative movement of the movable body 22 with respect to the movable panel 10 by the coupling between the first and second coupling members 31 and 32. Accordingly, in the embodiment disclosed here, the movable panel 10 is allowed to move (slide) back and force along the roof panel 2 in a state that the movable panel 10 is kept tilted up.

In the embodiment disclosed here, the coupling between the first and second coupling members 31 and 32 is released by the movement of the movable body 22 again to the switching area in a sliding state in which the movable panel 10 and the movable body 22 integrally move. Accordingly, a state in which the movable body 22 moving on the rail 21 moves relative to the movable panel 10 is achieved, so that the tilting state in which the movable panel 10 tilts in accordance with the relative position of the movable body 22 described above is restored.

In other words, in the embodiment disclosed here, the first and second coupling members 31 and 32 constitute a switching mechanism 40 configured to switch the coupled state between the movable panel 10 and the movable body 22 in the tilting state to that in the sliding state and switch the coupled state in the sliding state into that in the tilting state. The opening and closing drive unit 20 of the embodiment disclosed here is configured to open and close the movable panel 10 to on the basis of an operation of a coupling mechanism 50 composed of the switching mechanism 40 and the tilt mechanism 30.

Figure 3:
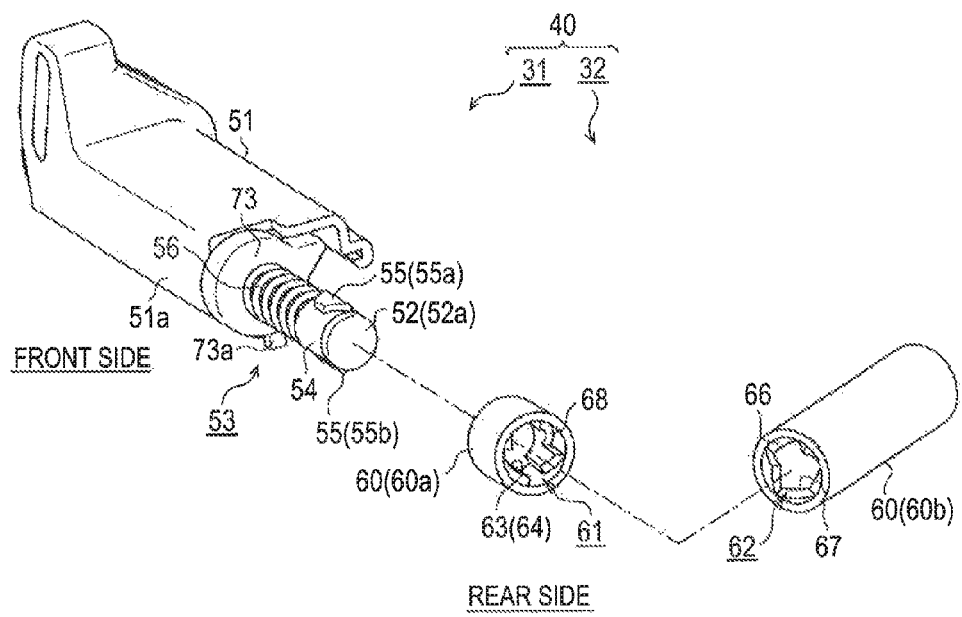
FIG. 3 is a perspective view of a switching mechanism provided in the opening and closing drive unit.

As illustrated in FIG. 3, in the embodiment disclosed here, the first coupling member 31 is provided with a body portion 51 coupled to the supporting bracket 25 of the movable panel 10, and slidable on the rail 21. The body portion 51 is also provided with a rotating shaft 52 extending from a rear end portion 51a thereof rearward of the vehicle (see FIG. 2, rightward in FIG. 2), that is, in the direction of relative movement with respect to the second coupling member 32. The rotating shaft 52 is provided with a rotating cam 53 rotatably supported at a distal end thereof.

In contrast, the second coupling member 32 includes a substantially cylindrical shaped outline opening forward of the vehicle, that is, toward the first coupling member 31, and is provided on the movable body 22 at a position coaxial with the rotating cam 53. In other words, in the embodiment disclosed here, the rotating cam 53 of the first coupling member 31 is inserted into a cylinder of the second coupling member 32 by the forward movement of the movable body 22 in a switching area α. In the interior of the cylinder of the second coupling member 32, the second coupling member 32 and the rotating cam 53 engage and a disconnection of the rotating cam 53 is restricted, so that the first and second coupling members 31 and 32 are coupled so as to be integrally movable.

Figure 4A:
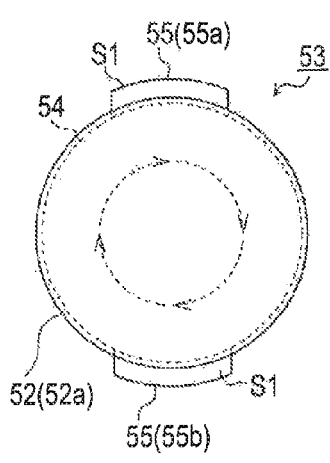
FIG. 4A is a front view of a rotating cam.

Specifically, as illustrated in FIG. 3 and FIG. 4A, the rotating cam 53 of the first coupling member 31 includes a substantially column shaped rotating cam body 54 rotatably supported at a position near the distal end of the rotating shaft 52, and a plurality of engaging projection 55 projecting radially outward from an outer periphery of the rotating cam body 54. Specifically, the rotating cam 53 of the embodiment disclosed here includes two engaging projections 55a and 55b provided on the outer periphery of the rotating cam body 54 at substantially equiangular intervals (substantially 180° intervals). Also, in the embodiment disclosed here, a disc-shaped flange 52a extending radially outward is formed at the distal end of the rotating shaft 52. Furthermore, a coil spring 56 is fitted on the rotating shaft 52 in a form that both ends thereof come into abutment with the body portion 51 and the rotating cam 53. The rotating cam 53 is configured to be retained in rotational position by being pressed against the flange 52a on the basis of a resilient force of the coil spring 56.

In contrast, as illustrated in FIG. 3, the second coupling member 32 includes a housing 60 coaxially coupling a first housing 60a and a second housing 60b both having a substantially cylindrical shape, and a first cam portion 61 and a second cam portion 62 formed in the housing 60.

Figure 4B:
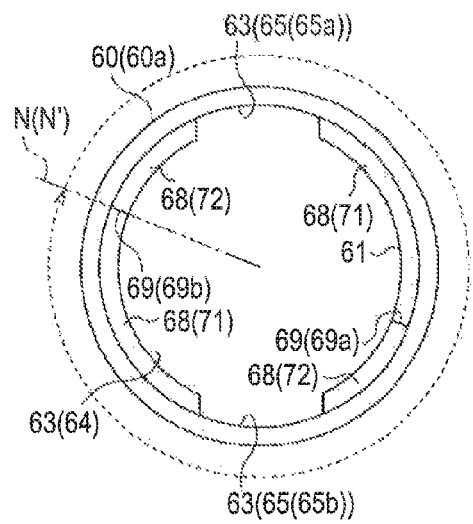
FIG. 4B is a back view of a first cam portion.

As illustrated in FIG. 3 and FIG. 4B, the first cam portion 61 is provided in the first housing 60a having an opening portion facing the first coupling member 31. The first cam portion 61 is formed with a through hole 63 which allows insertion of the rotating cam 53 of the first coupling member 31 by the forward movement of the movable body 22 as described above.

Specifically, the through hole 63 is made of a circular hole 64 having a diameter substantially equal to (slightly larger than) the diameter of the flange 52a provided at the distal end of the rotating shaft 52 and penetrating in the axial direction through the first cam portion 61 and a plurality of insertion grooves 65 extending in the axial direction so as to notch a peripheral edge portion of the circular hole 64. In the embodiment disclosed here, two insertion grooves 65a and 65b are formed on the peripheral edge portion of the circular hole 64 at substantially equiangular intervals (180° intervals). The rotating cam 53 is configured to be inserted into the through hole 63 of the first cam portion 61 in a form in which the rotating cam body 54 passes through the circular hole 64 and the engaging projections 55a and 55b pass through the respective insertion grooves 65a and 65b.

As illustrated in FIG. 3, the second cam portion 62 is arranged on the rear side of the first cam portion 61 (see FIG. 2, right side in FIG. 2, in the back of the interior of the cylinder of the housing 60) by being provided in the interior of the second housing 60b coupled to a rear end (portion illustrated in FIG. 4B) of the first housing 60a. The second cam portion 62 is formed with a cam surface 66 which causes the rotating cam 53 to rotate by coming into abutment with the rotating cam 53 inserted into the through hole 63 of the first cam portion 61 as described above.

Specifically, the second cam portion 62 of the embodiment disclosed here includes a circular hole 67 having a diameter substantially equal to (slightly larger than) the diameter of the flange 52a provided at the distal end of the rotating shaft 52 and penetrating through the second cam portion 62 in the axial direction in the same manner as the circular hole 64 of the first cam portion 61. The cam surface 66 is formed on a peripheral edge of the circular hole 67.

In other words, the cam surface 66 is provided at a position which comes into abutment with the engaging projections 55 (55a and 55b) of the rotating cam 53 inserted into the insertion hole 63 of the first cam portion 61. The cam surface 66 is configured to rotate the rotating cam 53 which comes into abutment therewith by a relative movement via the through hole 63 of the first cam portion 61 to a position at which the disconnection from the through hole 63 is not possible.

Figure 5:
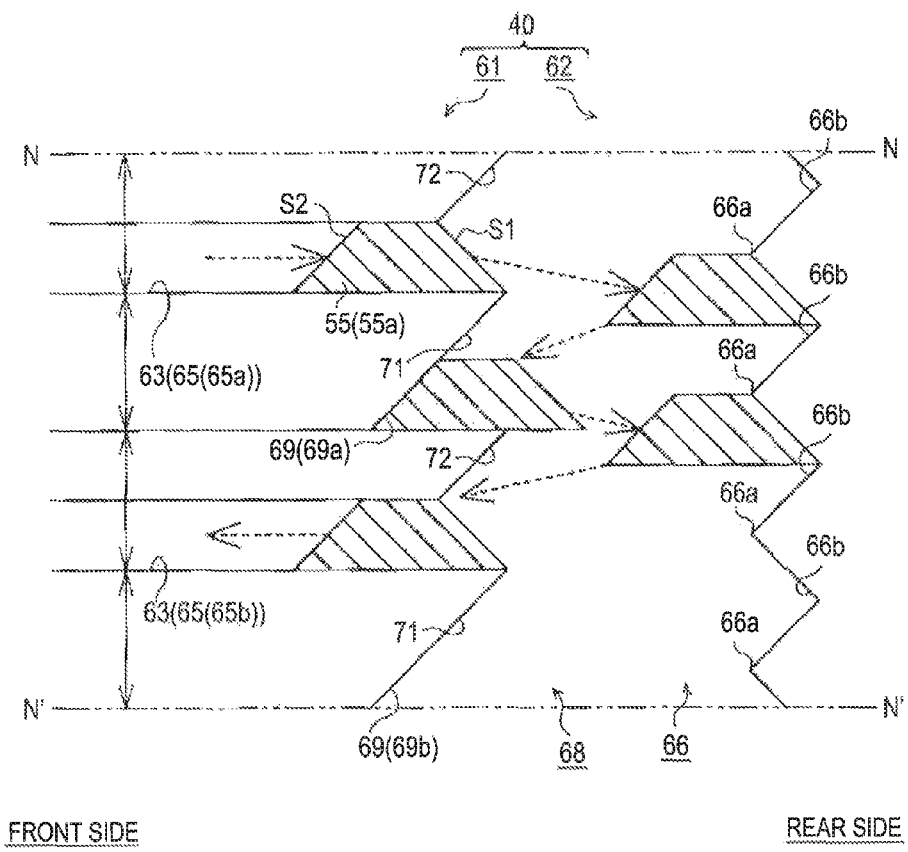
FIG. 5 is a developed view of the first cam portion and a second cam portion which constitute the switching mechanism.

More specifically, as illustrated in FIG. 5, in the embodiment disclosed here, the cam surface 66 is formed with a plurality of (four in the embodiment disclosed here) crest portions 66a projecting toward the first cam portion 61 opposing in the axial direction (the lateral direction in FIG. 5). Specifically, the crest portions 66a and trough portions 66b formed between the crest portions 66a are formed on a peripheral edge portion of the circular hole 67 at substantially equiangular intervals (substantially 90° intervals). The cam surface 66 of the embodiment disclosed here are formed with the respective crest portions 66a at positions shifted from the positions opposing the through hole 63 of the first cam portion 61.

For the sake of convenience of the description, only a trajectory of movement of one of the engaging projections 55 (55a) is illustrated in FIG. 5, and illustration of the other engaging projection 55 (55b) is omitted.

In other words, in the embodiment disclosed here, the engaging projections 55 (55a and 55b) of the rotating cam 53 moving rearward (rightward in FIG. 5) of the first cam portion 61 through the respective insertion grooves 65 (65a and 65b) which constitute the through hole 63 come into abutment with inclined portions between the crest portions 66a and the trough portions 66b on the cam surface 66 formed as described above in appearance. In the embodiment disclosed here, each of the engaging projections 55 are formed with an inclined surface S1 at a portion coming into abutment with the cam surface 66 so as to match the cam surface 66. As the respective engaging projections 55 coming into abutment with the cam surface 66 move from the crest portions 66a toward the trough portions 66b, the rotating cam 53 rotates to a rotational position where the respective engaging projections 55 cannot pass through the insertion grooves 65, that is, the position at which the disconnection from the through hole 63 of the first cam portion 61 is not possible.

Here, the second cam portion 62 of the embodiment disclosed here is provided at a position apart from the first cam portion 61 in the axial direction. Therefore, the rotating cam 53 is allowed to move between the first cam portion 61 and the second cam portion 62 in the axial direction in appearance by a relative movement between the first and second coupling members 31 and 32. The first cam portion 61 is provided with a cam surface 68 facing the cam surface 66 of the second cam portion 62.

In other words, in the switching mechanism 40 of the embodiment disclosed here, the rotating cam 53 moves away from the cam surface 66 of the second cam portion 62 by the relative movement of the first coupling member 31 on which the rotating cam 53 is provided and the second coupling member 32 on which the first cam portion 61 and the second cam portion 62 are provided in the direction away from each other, that is, by the movement of the movable body 22 rearward of the vehicle. Then, the rotating cam 53 moves in the direction getting closer to the first cam portion 61 in appearance, and hence comes into abutment with the cam surface 68 of the first cam portion 61.

The cam surface 68 is configured to cause the rotating cam 53 moving away from the cam surface 66 of the second cam portion 62 and coming into abutment with the cam surface 68 to rotate in the same direction as the cam surface 66 of the first cam portion 61, that is, in the direction in which the respective engaging projections 55 (55a and 55b) move further away from the respective insertion grooves 65 (65a and 65b) passed when being inserted into the through hole 63. In the embodiment disclosed here, each of the engaging projections 55 is formed with an inclined surface 82 at a portion coming into abutment with the cam surface 68 so as to match the cam surface 68. The cam surface 68 is formed with an engaging depression 69 configured to engage the rotating cam 53 which is further rotated by the abutment thereof.

Specifically, the cam surface 68 is provided with the engaging depressions 69 (69a and 69b) engageable with the respective engaging projections 55 (55a and 55b) of the rotating cam 53 between the respective insertion grooves 65 (65a and 65b) on the peripheral edge portion of the circular hole 64. In the embodiment disclosed here, the engaging depressions 69 (69a and 69b) are provided at positions away from the respective insertion grooves 65 (65a and 65b) in the circumferential direction by a predetermined angle (substantially 90°). The cam surface 68 includes a first guide portion 71 configured to guide the engaging projections 55 (55a and 55b) abutting therewith to an engaging position with respect to the engaging depressions 69 (69a and 69b). Accordingly, the first cam portion 61 is configured to retain the rotating cam 53 rotated to a rotational position at which the disconnection from the through hole 63 is not possible at the position at which the disconnection is not possible.

In the switching mechanism 40 of the embodiment disclosed here, the first coupling member 31 and the second coupling member 32 are coupled to each other in this manner, whereby the relative movement in the direction away from each other is restricted. Accordingly, the first and second coupling members 31 and 32 move integrally and hence the coupled state between the movable panel 10 and the movable body 22 is switched from the tilting state to the sliding sate.

As illustrated in FIG. 3, the first coupling member 31 includes a rotation check 73 configured to be rotated by a rearward movement of the movable panel 10 integrally with the movable body 22 and engage the movable body 22 at an engaging projection 73a thereof. When the coupled state between the movable panel 10 and the movable body 22 is in the sliding state, the relative movement between the first coupling member 31 and the second coupling member 32 is restricted by the rotation check 73.

In addition, in the embodiment disclosed here, the rotation check 73 is configured to restore to a position at which the engaging projection 73a does not engage the movable body 22 by the movement of the movable body 22 again to the switching area α. Accordingly, when the movable body 22 is in the switching area α, the relative movement between the first coupling member 31 and the second coupling member 32 is allowed.

In other words, as illustrated in FIG. 5, the rotating cam 53 retained on (the engaging depression 69 of) the cam surface 68 of the first cam portion 61 at the rotational position at which the disconnection from the through hole 63 is not possible as described above moves away from the engaging depression 69 of the first cam portion 61 by the relative movement in the direction in which the first and second coupling members 31 and 32 get closer, that is, the forward movement of the movable body 22 in the switching area α. The rotating cam 53 moves in the direction getting closer to the second cam portion 62 (rightward in FIG. 5) in appearance and comes into abutment with the cam surface 66 of the second cam portion 62 again, whereby the respective engaging projections 55 (55a and 55b) rotate in the direction further away from the insertion grooves 65 (65a and 65b) through which the engaging projections 55 (55a and 55b) have passed at the time of insertion into the through hole 63.

Furthermore, the first coupling member 31 and the second coupling member 32 move away relative to each other in this state, that is, the movable body 22 moves rearward of the vehicle, whereby the rotating cam 53 moves away from the cam surface 66 of the second cam portion 62 and moves toward the first cam portion 61 (leftward in FIG. 5). The cam surface 68 of the first cam portion 61 includes a second guide portion 72 configured to guide the engaging projections 55 (55a and 55b) of the rotating cam 53 in abutment therewith by the axial movement thereof to the insertion grooves 65 (65a and 65b) on a side opposite to a side where the engaging projections 55 (55a and 55b) have passed at the time of insertion into the through hole 63. Accordingly, the cam surface 66 of the second cam portion 62 and the cam surface 68 of the first cam portion 61 cooperate to each other, so that the rotating cam 53 is allowed to be rotated to the position at which the disconnection form the through hole 63 is possible.

In the switching mechanism 40 of the embodiment disclosed here, the coupling between the first coupling member 31 and the second coupling member 32 is released in this manner, whereby the relative movement in the direction away from each other is allowed. Accordingly, the coupled state between the movable panel 10 and the movable body 22 is switched from the sliding state to the tiling state.

Subsequently, an electric configuration of the sunroof apparatus 11 of the embodiment disclosed here will be described.

Figure 6:
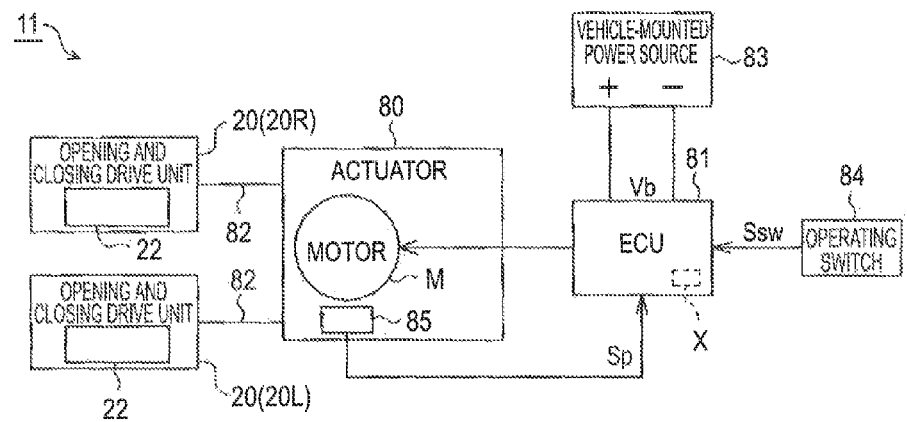
FIG. 6 is a block diagram illustrating a schematic configuration of the sunroof apparatus.

As illustrated in FIG. 6, the sunroof apparatus 11 of the embodiment disclosed here includes an actuator 80 driven by a motor M as a drive source, and an ECU 81 configured to supply drive power to the actuator 80. The opening and closing drive units 20 configured as described above are each configured in such a manner that the movable body 22 moves on the rail 21 on the basis of the drive force generated by the actuator 80.

Specifically, in the embodiment disclosed here, a drive force generated by the actuator 80 is transmitted to the left and right opening and closing drive units 20 (20L and 20R) via a power transmitting mechanism 82. The power transmitting mechanism 82 is configured by using a belt or a chain, for example. The ECU 81 supplies drive power on the basis of a power supply voltage Vb of a vehicle-mounted power source (battery) 83 to the motor M. The ECU 81 as a control unit controls the operations of the opening and closing drive units 20 via the supply of the drive power to the motor M.

Specifically, the ECU 81 is configured to receive a supply of an output signal (operation input signal Ssw) of an operating switch 84 provided in a vehicle cabin, not illustrated. In the embodiment disclosed here, the actuator 80 is provided with a pulse sensor 85 configured to output a pulse signal Sp synchronous with the rotation of the motor M, and the pulse sensor 85 detects the moved positions of the movable bodies 22 on the rails 21 by counting (edges of) the pulse signal Sp. The moved positions of the detected movable bodies 22 are stored in a storage area X. The ECU 81, then, controls the operations of the opening and closing drive units 20 on the basis of an operation input with respect to the operating switch 84 and the moved positions of the movable bodies 22.

Subsequently, a state of control of the opening and closing drive units 20 by the ECU 81 of the embodiment disclosed here will be described.

Figure 7:
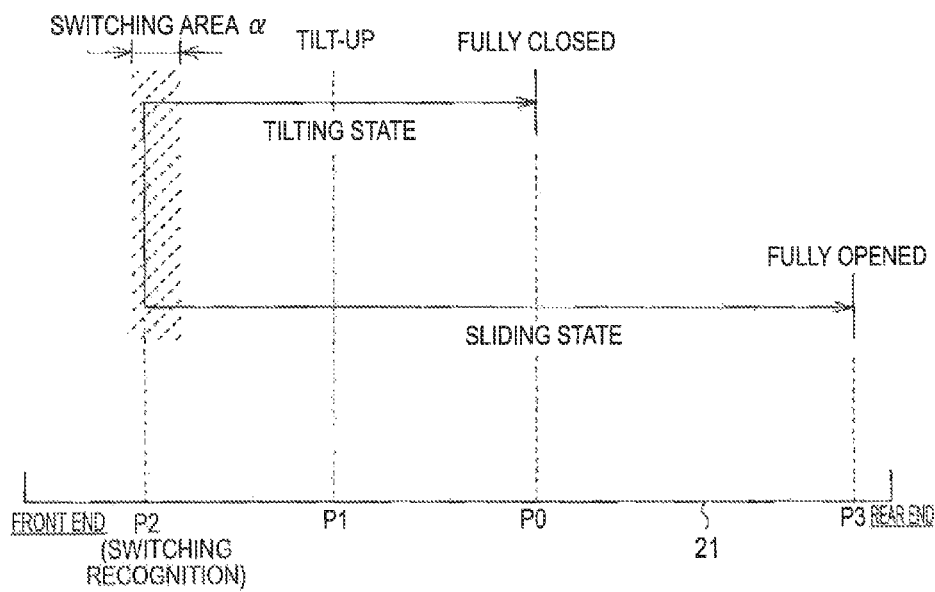
FIG. 7 is an explanatory drawing illustrating a control state of the opening and closing drive unit.

In the embodiment disclosed here, when in the tilting state in which the movable bodies 22 of the opening and closing drive units 20 move relative to the movable panel 10 (see FIG. 2A), the ECU 81 moves the movable bodies 22 forward on the basis of the operation input signal Ssw which requires an opening operation of the movable panel 10 as illustrated in FIG. 7. Also, the movable bodies 22 are moved rearward on the basis of the operation input signal SsW which requires a closing operation of the movable panel 10. In this manner, the operations of the opening and closing drive units 20 are controlled so that the movable panel 10 is opened and closed by the tilting operation thereof.

In contrast, when in the sliding state in which the movable panel 10 and the movable bodies 22 move integrally (see FIG. 2B), the ECU 81 moves the movable bodies 22 rearward on the basis of the operation input signal Sew which requires the opening operation of the movable panel 10. Also, the movable bodies 22 are moved forward on the basis of the operation input signal SsW which requires the closing operation of the movable panel 10. In this manner, the operations of the opening and closing drive units 20 are controlled so that the movable panel 10 is opened and closed by the sliding movement thereof.

In other words, the ECU 81 of the embodiment disclosed here moves the movable bodies 22 forward on the basis of the request of the opening operation via the operating switch 84 until the movable bodies 22 of the opening and closing drive units 20 reach from a fully-closed position P0 of the movable panel 10 to the switching area cc by the forward movement thereof, and rearward on the basis of the request of the closing operation. In the embodiment disclosed here, the tilt mechanism 30 is configured to tilt up the movable panel 10 substantially completely at a position P1 rearward of the switching area α. The ECU 81 moves the movable bodies 22 rearward on the basis of the request of the opening operation via the operating switch 84 until the movable bodies 22 of the opening and closing drive units 20 reach from a fully-opened position P3 of the movable panel 10 to the switching area α by the forward movement thereof, and forward on the basis of the request of the closing operation.

Here, in a configuration in which the coupled state between the movable panel 10 and the movable bodies 22 is mechanically switched by the forward movement of the movable bodies 22 in the switching area α as described above, a load is applied to the movable bodies 22 moving on the rails 21 when the coupled state is switched.

Specifically, each of the switching mechanisms 40 of the embodiment disclosed here includes the first and second coupling members 31 and 32 moving relative to each other by the movement of the movable body 22 in the switching area α (see FIG. 3 to FIG. 5) as described above. Subsequently, the rotating cam 53 provided on the first coupling member 31 and the cam surface 66 provided on the second coupling member 32 come into abutment with each other by the forward movement of the movable body 22, on that the coupled state between the movable panel 10 and the movable body 22 is switched.

In other words, in a configuration in which the switching mechanism 40 as in the embodiment disclosed here is provided, the rotating cam 53 of the first coupling member 31 and the cam surface 66 of the second coupling member 32 push each other while the movable body 22 moves forward even after the coupled state with respect to the movable panel 10 is switched. A pressing force generated between the rotating cam 53 and the cam surface 66 acts on the movable body 22 as a load.

The pulse sensor 85 provided on the actuator 80 outputs the pulse signal Sp synchronous with the rotation of the motor M which corresponds to the drive source thereof. Therefore, the load acting on the movable body 22, that is, a motor load is increased, and the pulse width (edge interval) is decreased with decrease in speed of rotation of the motor.

In view of such circumstances, the ECU 81 of the embodiment disclosed here detects load variation caused by switching of the coupled state between the movable panel 10 and the movable body 22 on the basis of the change of the pulse signal Sp output from the pulse sensor 85. When the switching of the coupled states of both of the left and right opening and closing drive units 20 (20L and 20R) are recognized on the basis of the load variation, the ECU 81 controls the opening and closing drive units 20 (20L and 20R) to move the movable bodies 22 reversely.

In other words, the ECU 81 of the embodiment disclosed here determines the position P2 at which the movements of the movable bodies 22 are reversed from the front to the rear by recognizing the switching of the coupled states in both of the left and right opening and closing drive units 20 (20L and 20R) in the opening and closing drive being executed. Needless to say, the "opening and closing drive" in this case corresponds to either one of opening drive of the movable panel 10 by the "tilt-up & slide-open" or closing drive of the movable panel 10 by "slide-close & tilt-down".

The ECU 81 of the embodiment disclosed here discriminates a situation in which the coupled state is switched in both of the left and right opening and closing drive units 20 (20L and 20R) and a situation in which the coupled state is switched in one of the opening and closing drive units 20.

In other words, the motor load in the situation in which the coupled state is switched in both of the left and right opening and closing drive units 20 (20L and 20R) is larger than the motor load in the situation in which the coupled state is switched only in one of the opening and closing drive units 20 (20L and 20R). Therefore, the ECU 81 is capable of discriminating the situation in which the coupled state is switched in both of the left and right opening and closing drive units 20 (20L and 20R) and the situation in which the coupled state is switched in one of the opening and closing drive units 20 on the basis of the magnitude of the motor load appearing in the pulse signal Sp which indicates an occurrence of the load variation.

The ECU 81 of the embodiment disclosed here is configured to prohibit the stop and the reverse movement of the movable body 22 until the switching of the coupled state is recognized in both of the left and right opening and closing drive units 20 (20L and 20R) when the switching of the coupled state is recognized in one of the opening and closing drive units 20 by the procedure described above.

Subsequently, the switching recognition of the coupled state in the opening and closing drive units 20 (20L and 20R) and the process procedure of the reverse movement control of the movable body 22 on the basis of the switching recognition executed by the ECU 81 of the embodiment disclosed here will be described.

Figure 8:
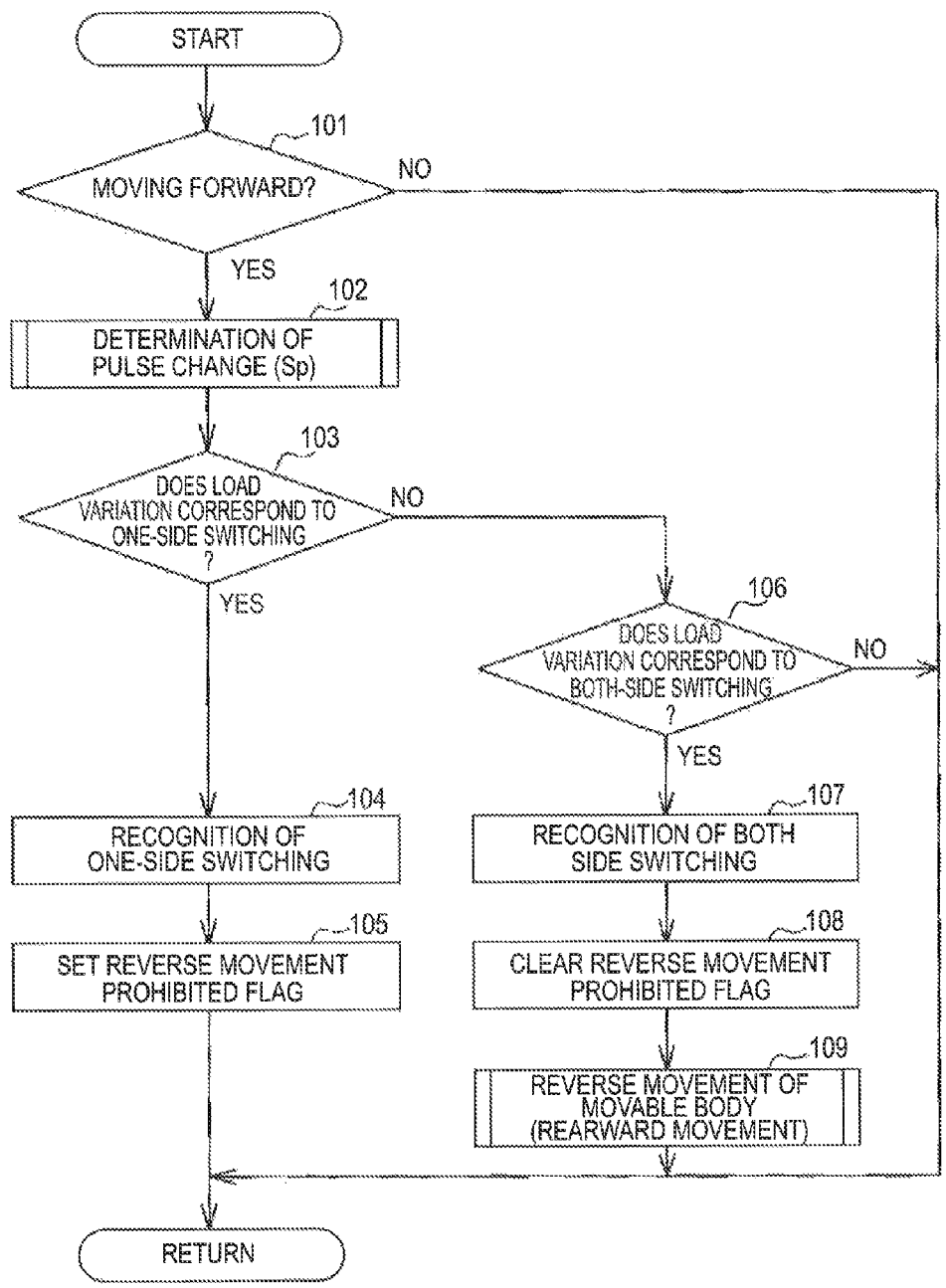
FIG. 8 is a flowchart illustrating a process procedure relating to recognition of a switching of a coupled state of the opening and closing drive units and a reverse movement control of movable bodies on the basis of the recognition of the switching.

As illustrated in the flowchart in FIG. 8, the ECU 81 of the embodiment disclosed here executes a load variation detecting process on the basis of a change of the pulse signal Sp output from the pulse sensor 85 described above in a case where the movable bodies 22 of the opening and closing drive units 20 (20L and 20R) move forward (Yes in Step 101) (DETERMINATION OF PULSE CHANGE, Step 102).

Specifically, the ECU 81 determines whether or not the magnitude of the motor load appearing in the pulse signal Sp which indicates an occurrence of the load change corresponds to the situation in which the coupled state of one of the opening and closing drive units 20 is switched (DOES LOAD VARIATION CORRESPOND TO ONE-SIDE SWITCHING?, Step 103) in the determination of the pulse change. When the determination condition in Step 103 is met (Yes in Step 103), the fact that the coupled state is switched in only one of the opening and closing drive units 20 is recognized (Step 104).

The ECU 81 of the embodiment disclosed here sets a reverse movement prohibited flag in a case where the switching of the coupled state is recognized in one of the opening and closing drive units 20 as described above (Step 105). Then, the stop and the reverse movement of the movable body 22 is prohibited by not accepting an input by an operation of the operating switch 84 until the reverse movement prohibited flag is cleared.

In contrast, when the determination condition in Step 103 is not met (No in Step 103), the ECU 81 subsequently determines whether the magnitude of the motor load appearing in the pulse signal Sp which indicates the occurrence of the load variation corresponds to the situation in which the coupled states of both of the left and right opening and closing drive units 20 (20L and 20R) are switched (DOES LOAD VARIATION CORRESPOND TO BOTH-SIDE SWITCHING?, Step 106). Then, when the determination condition in Step 106 is met (Yes in Step 106), the fact that the coupled state is switched in both of the left and right opening and closing drive units 20 (20L and 20R) is recognized (Step 107).

The ECU 81 of the embodiment disclosed here clears the reverse movement prohibited flag in a case where the switching of the coupled state is recognized in the both opening and closing drive units 20 (20L and 20R) as described above (Step 108). Then, the opening and closing drive units 20 (20L and 20R) are controlled so as to move the movable bodies 22 reversely, that is, toward the rear (Step 108).

The ECU 81 of the embodiment disclosed here does not execute the processes in Step 102 to Step 109 when the movable bodies 22 of the opening and closing drive units 20 (20L and 20R) move rearward (No in Step 101). The ECU 81 does not execute the processes in Step 104. Step 105, and Step 107 to Step 109 when the pulse signal Sp output from the pulse sensor 85 does not indicate the load variation caused by the switching of the coupled state between the movable panel 10 and the movable bodies 22 of the opening and closing drive units 20 (NO in Step 103 and No in Step 106).

Subsequently, an operation of the sunroof apparatus 11 configured as described above will be described.

In the embodiment disclosed here, the load variation caused by the switching of the coupled states between the movable panel 10 and the movable bodies 22 in the opening and closing drive units 20 (20L and 20R) on the basis of the pulse signal Sp synchronous with the rotation of the motor M is detected. Then, when the switching of the coupled states of both of the left and right opening and closing drive units 20 (20L and 20R) is recognized on the basis of the load variation, the ECU 81 controls the opening and closing drive units 20 (20L and 20R) to move the movable bodies 22 reversely. Therefore, the ECU 81 is capable of discriminating the situation in which the coupled states are switched in both of the left and right opening and closing drive units 20 (20L and 20R) and the situation in which the coupled state is switched in one of the opening and closing drive units 20 on the basis of the magnitude of the motor load appearing in the pulse signal Sp which indicates the occurrence of the load variation. Then, the stop and the reverse movements of the movable body 22 are prohibited until the switching of the coupled state is recognized in both of the left and right opening and closing drive units 20 (20L and 20R) when the switching of the coupled state is recognized in one of the opening and closing drive units 20 by the procedure described above.

As described above, according to the embodiment disclosed herein, the following advantages are achieved.

(1) In other words, in a configuration in which the coupled states between the movable panel 10 and the movable bodies 22 are mechanically switched by the forward movement of the movable bodies 22 in the switching area α, a load is applied to the movable bodies 22 moving on the rails 21 when the state is switched. Therefore, by detecting the load variation caused by the switching of the coupled state, the switching of the coupled state in the opening and closing drive units 20 (20L and 20R) is easily recognized by a simple configuration. In addition, when the switching of the coupled states of both of the left and right opening and closing drive units 20 (20L and 20R) is recognized, the ECU 81 controls the opening and closing drive units 20 (20L and 20R) to move the movable bodies 22 reversely, so that an occurrence of the situation that the coupled states of the left and right opening and closing drive units 20 (20L and 20R) become different may be suppressed. Consequently, the occurrence of lodging in the opening and closing drive units 20 is avoided, so that the switching between the tilting state and the sliding state is smoothly achieved.

(2) There arises a time-lag between timings of the switching of the coupled states between the opening and closing drive units 20 (20L and 20R) in many cases. In the situation in which the coupled state of only one of the opening and closing drive units 20 is switched, the opening and closing drive units 20 may be subjected to lodging due to the coupled states different from each other between the left and the right. However, when the switching of the coupled state is recognized in one of the opening and closing drive units 20 as described above, the occurrence of the lodging in the opening and closing drive units 20 may be avoided by prohibiting the stop and the reverse movement of the movable bodies 22 until the switching of the coupled state is recognized in both of the left and right opening and closing drive units 20 (20L and 20R). Accordingly, the switching between the tilting state and the sliding state is achieved smoothly.

(3) The actuator 80 configured to drive the opening and closing drive units 20 (20L and 20R) is provided with the pulse sensor 85 configured to output the pulse signal Sp synchronous with the rotation of the motor M as the drive source. Then, the ECU 81 detects the load variation caused by switching of the coupled state between the movable panel 10 and the movable body 22 on the basis of the change of the pulse signal Sp. Accordingly, the occurrence of the load variation may be detected easily.

(4) The switching mechanism 40 includes the first and second coupling members 31 and 32 configured to move relative to each other by the movement of the movable body 22 in the switching area α, and the coupled state between the movable body 22 and the movable panel 10 is switched by coupling and decoupling between the first and second coupling members 31 and 32. The first coupling member 31 includes the rotating cam 53 having the rotating shaft 52 extending in the direction of relative movement with respect to the second coupling member 32 and rotatably supported thereby. The second coupling member 32 includes the first cam portion 61 formed with the through hole 63 which allows insertion of the rotating cam 53 by the forward movement of the movable body 22 in the switching area α, and the second cam portion 62 having the cam surface 66 configured to come into abutment with the rotating cam 53 inserted into the through hole 63 to cause the rotating cam 53 to rotate. The cam surface 66 of the first cam portion 61 is configured to change the rotational position of the rotating cam 53 coming into abutment with the cam surface 66 by being inserted into the through hole 63 to the position at which the disconnection from the through hole 63 is not possible. When the rotating cam 53 at the rotational position at which the disconnection is not possible comes into abutment with the cam surface 66 again by the forward movement of the movable body 22 in the switching area α, the cam surface 66 is configured to change the rotational position from the position at which the disconnection is not possible to a position at which the disconnection is possible.

In other words, in a configuration in which the switching mechanism 40 is provided, the rotating cam 53 of the first coupling member 31, and the cam surface 66 of the second coupling member 32 push each other while the movable body 22 continues to move forward even after the coupled state with respect to the movable panel 10 is switched. The pressing force generated between the rotating cam 53 and the cam surface 66 acts on the movable body 22 as a load. Therefore, the switching of the coupled state may be recognized in the opening and closing drive units 20 (20L and 20R) with further degree of accuracy on the basis of the load variation caused by the switching of the coupled state.

The embodiment described above may be modified as follows.

In the embodiment disclosed here, the switching mechanism 40 includes the first coupling member 31 provided on the movable panel 10, and the second coupling member 32 provided on the movable body 22. Then, the coupled state between the movable body 22 and the movable panel 10 is switched by coupling and decoupling between the first and second coupling members 31 and 32. However, this disclosure is not limited thereto, and a configuration in which the first coupling member 31 is provided on the movable body 22, and the second coupling member 32 is provided on the movable panel 10 is also applicable.

Any configuration is applicable to the switching mechanism 40 as long as the coupled state in the tilting state can be switched into the sliding state and the coupled state in the sliding state can be switched into the tilting state by the movement of the movable body 22 into the switching area α set at the forward position where the movable panel 10 is tilted up. Specifically, a configuration in which the tilting state and the sliding state are switched by the configuration disclosed in Reference 1. However, when considering the accuracy of the switching recognition of the coupled states of the opening and closing drive units 20 (20L and 20R), it is preferable that a great load variation is caused by the switching of the coupled state.

In the embodiment disclosed here, the cam surface 66 of the second cam portion 62 and the cam surface 68 of the first cam portion 61 are cooperated to rotate the rotating cam 53 to the position at which the disconnection from the through hole 63 is possible. However, this disclosure is not limited thereto, and a configuration in which the rotating cam 53 at the rotational position at which the disconnection is not possible is changed to the position at which the disconnection is possible solely by the cam surface 66 of the second cam portion 62. In the same manner, a configuration in which the rotating cam 53 which comes into abutment therewith by the relative movement via the through hole 63 of the first cam portion 61 is rotated to a position of engagement with the engaging depression 69 of the first cam portion 61 solely by the cam surface 66 of the second cam portion 62.

In the embodiment disclosed here, the rotating cam 53 includes the two engaging projections 55a and 55b provided on the outer periphery of the rotating cam body 54 at substantially equiangular intervals (substantially 180° intervals). The through hole 63 is formed with the two insertion grooves 65a and 65b formed at substantially equiangular intervals (180° intervals) corresponding to the engaging projections 55a and 55b. However, this disclosure is not limited thereto, and the number of the engaging projections on the rotating cam 53 and the number of the insertion grooves 65 in the through hole 63 may be changed arbitrarily. The shapes of the rotating cam 53 and the through hole 63 may also be changed arbitrarily within a range in which the rotating cam 53 and the through hole 63 serve as the switching mechanism 40.

In the embodiment disclosed here, the guide hole 26 is provided on the side of the movable body 22, and the guide pin 27 is provided on the (supporting bracket 25 of the) movable panel 10. However, this disclosure is not limited thereto, and a configuration in which the guide pin 27 is provided on the movable body 22 and the guide hole 26 is provided on the (supporting bracket 25 of the) movable panel 10 is also applicable (Reference 1).

In the embodiment disclosed here, the ECU 81 detects the load variation caused by switching of the coupled state between the movable panel 10 and the movable body 22 on the basis of the pulse signal Sp synchronous with the rotation of the motor M output from the pulse sensor 85 provided on the actuator 80. However, this disclosure is not limited thereto, and a source of generation may be of any type such as a configuration using a current ripple of the motor M, for example, as long as the pulse signal which can detect the load variation is acquired.

Figure 9:
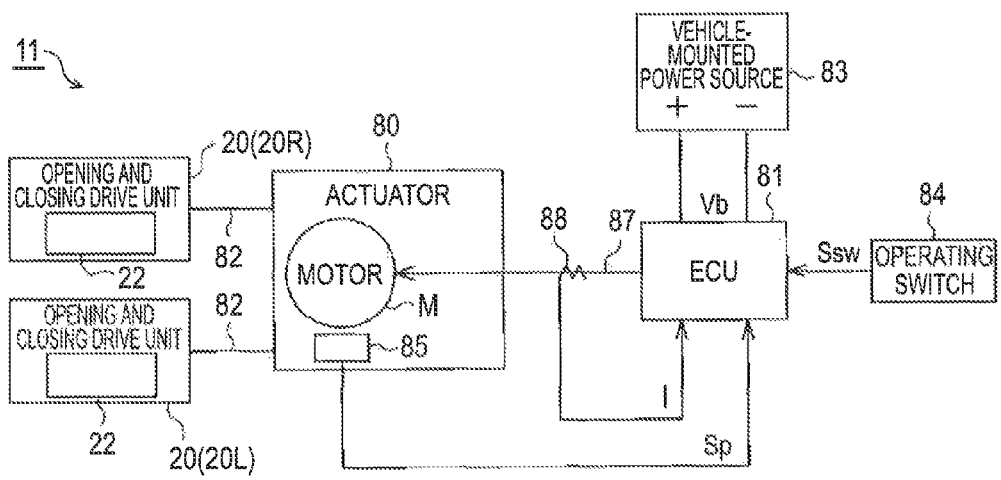
FIG. 9 is a block diagram illustrating a schematic configuration of the sunroof apparatus of another example.

As illustrated in FIG. 9, a configuration in which a current sensor 88 is provided at a midpoint of a power supply route 87 with respect to the motor M, and the load variation caused by the switching of the coupled state is detected on the basis of the change of the current amount supplied to the motor M is also applicable. In this configuration as well, the same advantages as the embodiment disclosed here are achieved. By employing the detection of the load variation on the basis of the pulse signal Sp as well, improvement of the detection accuracy is achieved.

In the embodiment disclosed here, the opening and closing drive units 20 (20L and 20R) are configured in such a manner that the movable bodies 22 move on the rails 21 on the basis of the drive power generated by the single actuator 80 having the motor M as a drive source, However, this disclosure is not limited thereto, and a configuration in which the opening and closing drive units 20 have the independent drive sources respectively is also applicable.

Figure 10:
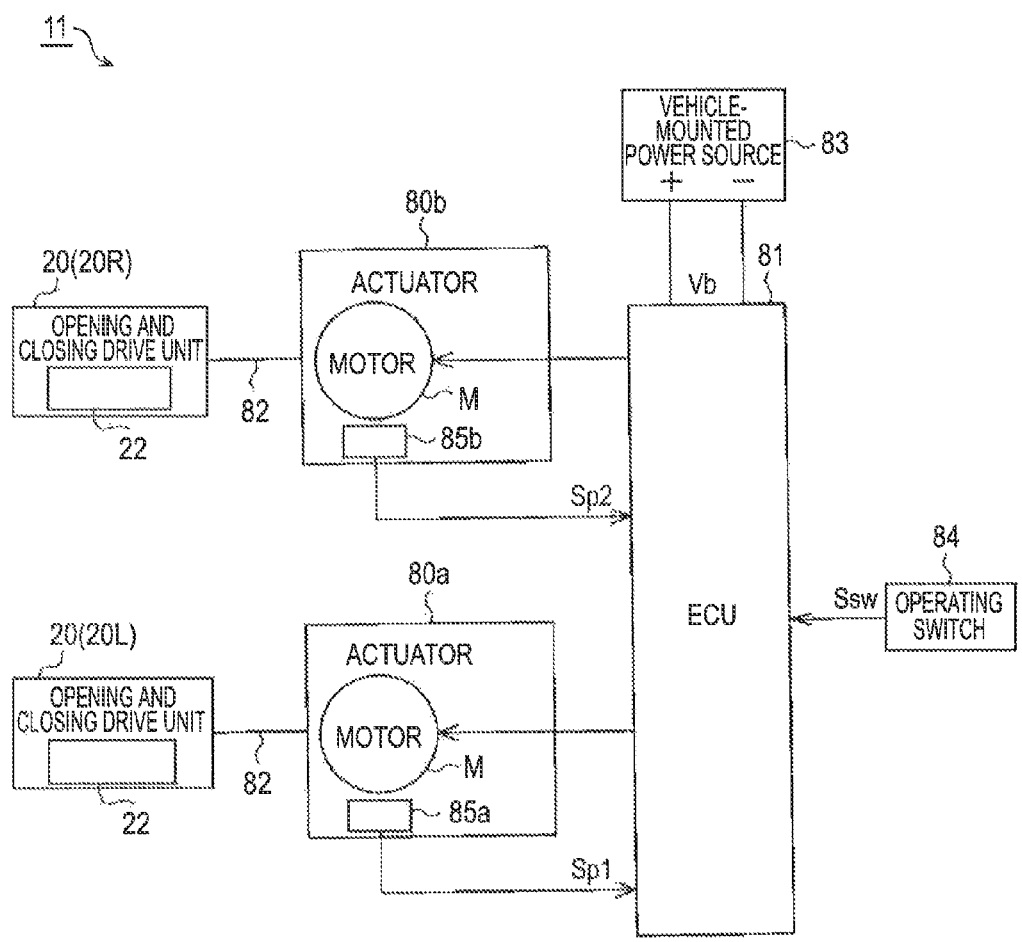
FIG. 10 is a block diagram illustrating a schematic configuration of the sunroof apparatus of another example.

For example, as illustrated in FIG. 10, the opening, and closing drive units 20 (20L and 20R) may be configured to be driven by actuators 80a and 80b provided independently. Furthermore, a configuration in which the load variations generated by the switching of the coupled state is detected independently for the opening and closing drive units 20 (20L and 20R) on the basis of pulse signals Sp1 and Sp2 output from the pulse sensors 85a and 85b provided on the actuators 80a and 80b respectively.

Figure 11:
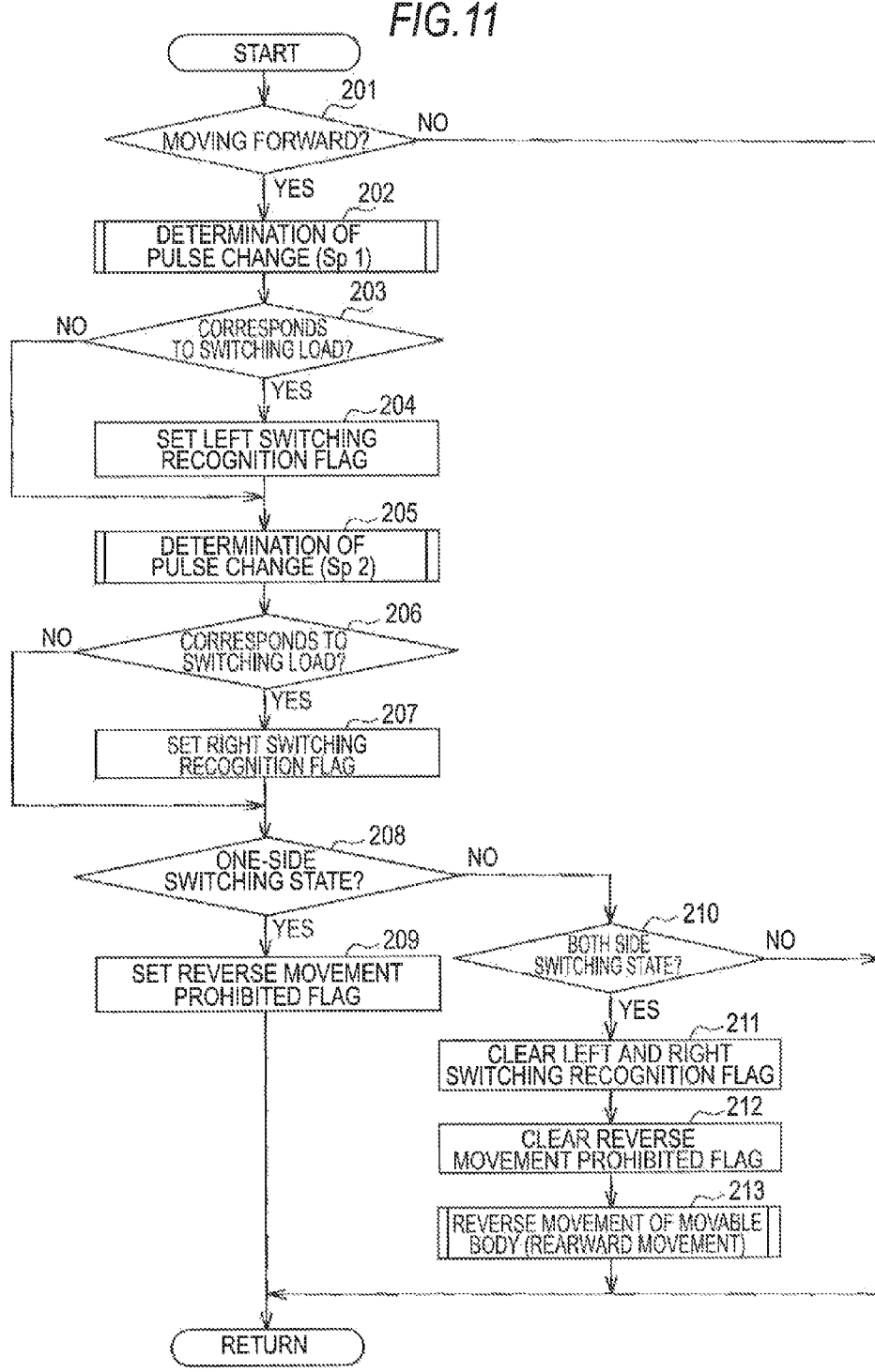
FIG. 11 is a flowchart illustrating a process procedure of another example relating to recognition of a switching of a coupled state of the opening and closing drive units and a reverse movement control of the movable bodies on the basis of the recognition of the switching.

Specifically, as illustrated in the flowchart illustrated in FIG. 11, first of all, a change of the pulse signal Sp1 output from the pulse sensor 85a provided on the actuator 80 driving the opening and closing drive unit 20L on one side (left side) is determined in a case where the movable bodies 22 of the opening and closing drive units 20 (20L and 20R) move forward (Yes in Step 201) (Step 202). Then, in a case where it is determined that the load variation which indicates the switching of the coupled state in the opening and closing drive unit 20L appears in the pulse signal Sp1 (Yes in Step 203), a left switching recognition flag indicating that the switching of the coupled state is recognized in the opening and closing drive unit 20L is set (Step 204). If it is determined that the load variation indicating the switching of the coupled state is not appeared in Step 203 (No in Step 203), the process in the Step 204 is not executed.

As regards the pulse signal Sp2 which is output from the pulse sensor 85b provided on the actuator 80 configured to drive the opening and closing drive unit 20R on the other side (right side) as well, the change thereof is determined (Step 205). In a case where it is determined that a load variation which indicates the switching of the coupled state in the opening and closing drive unit 20R appears in the pulse signal Sp2 (Yes in Step 206), a right switching recognition flag indicating that the switching of the coupled state is recognized in the opening and closing drive unit 20R is set (Step 207). If it is determined that the load variation indicating the switching of the coupled state is not appeared in Step 206 (No in Step 206), the process in the Step 207 is not executed.

Subsequently, whether or not the situation in which the coupled state is switched only on one of the opening and closing drive units 20 (20L and 20R) is determined on the basis of the situation of setting of the left and right switching recognition flags (Step 208). If the switching of the coupled state is recognized in one of the opening and closing drive units 20 (Yes in Step 208), a reverse movement prohibited flag is set (Step 209). In the same manner as the embodiment disclosed here, the stop and the reverse movement of the movable body 22 is prohibited by not accepting an input by an operation of the operating switch 84 until the reverse movement prohibited flag is cleared.

In contrast, in Step 208, if it is determined that it is not a situation in which the coupled state only of one of the opening and closing drive units 20 (20L and 20R) is switched (No in Step 208), whether or not it is a state in which the coupled states of both of the left and right opening and closing drive units 20 (20L and 20R) are switched is determined subsequently (Step 210). Accordingly, if the coupled state is recognized in both of the left and right opening and closing drive units 20 (20L and 20R) (Yes in Step 210), the left and right switching flags and the reverse movement prohibited flag are cleared (Steps 211 and 212), and the opening and closing drive units 20 (20L and 20R) are controlled to move the movable bodies 22 reversely (Step 213).

In a case where the movable bodies 22 of the opening and closing drive units 20 (20L and 20R) move rearward (No in Step 201), the processes in Step 202 to Step 213 are not executed. In a case where the coupled state is not switched in any one of the opening and closing drive units 20 (20L and 20R) (No in Step 208 and No in Step 210) as well, the processes in Step 209 and Step 211 to Step 213 are not executed.

By recognizing the switching of the coupled states of the opening and closing drive units 20 (20L and 20R) independently in this manner, the accuracy of the recognition of the switching may be enhanced.

Figure 12:
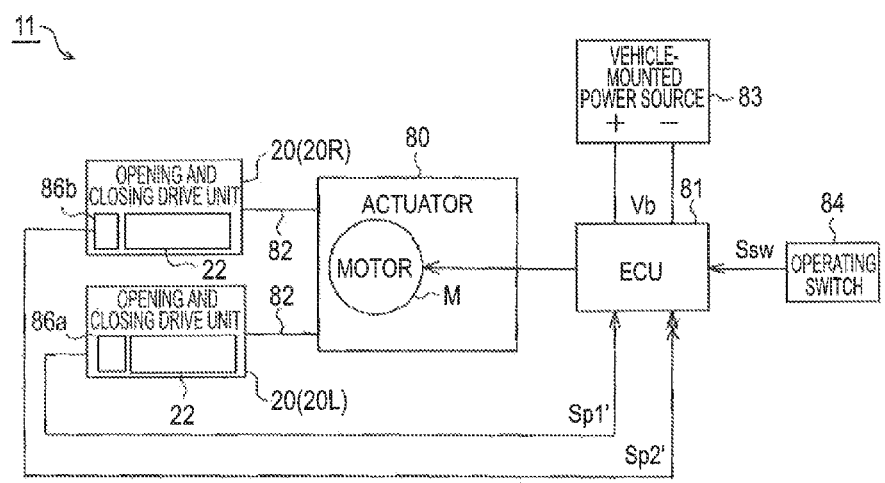
FIG. 12 is a block diagram illustrating a schematic configuration of the sunroof apparatus of another example.

Furthermore, a configuration in which the load variation caused by the switching of the coupled state is detected on the basis of the change of the speed of the movable bodies 22 moving on the rails 21 is also applicable. For example, pulse sensors 86a and 86b configured to output pulse signals Sp1' and Sp2' synchronous with the movements of the movable bodies 22 on the rails 21 respectively are provided on the opening and closing drive units 20 (20L and 20R) as described in FIG. 12. Then, the load variation caused by the switching of the coupled state may be detected on the basis of the change of the pulse signals Sp1' and Sp2'. In this configuration as well, the switching of the coupled state may be confirmed with high degree of accuracy.

As a method of recognizing the switching of the coupled state in the opening and closing drive units 20 (20L and 20R) in the case where the configuration as described above is employed, the process procedure illustrated in a flowchart of FIG. 11 may be used. A configuration in which the change of the speed of the movable bodies 22 is detected in a method other than the pulse signals Sp1' and Sp2' as described above is also applicable. By employing also the detection of the load variation on the basis of the pulse signal Sp synchronous with the rotation of the motor M and the detection of the load variation on the basis of the change of the current amount I to be supplied to the motor M together, improvement of the detection accuracy is achieved.

The embodiment disclosed here determines the position P2 at which the movement of the movable bodies 22 is reversed from the front to the rear by confirming the switching of the coupled states in both of the left and right opening and closing drive units 20 (20L and 20R) in the opening and closing drive being executed. However, this disclosure is not limited thereto, and the position P2 at which the movable bodies 22 are moved reversely from the front to the rear is defined as predetermined positions set in advance. Then, a configuration in which the recognition of the switching of the coupled states of both of the left and right opening and closing drive units 20 (20L and 20R) is performed when the movable bodies 22 reach the position P2 is also applicable. In other words, a configuration in which the recognition of the switching of the coupled state may be used for the detection of abnormality of the opening and closing drive units 20 (20L and 20R) is also applicable.

In the embodiment disclosed here, the stop and the reverse movement of the movable body 22 are prohibited until the switching of the coupled state is recognized in both of the left and right opening and closing drive units 20 (20L and 20R) when the switching of the coupled state is recognized in one of the opening and closing drive units 20. However, this disclosure is not limited thereto, and a configuration in which the process of prohibiting the stop and the reverse movement of the movable body 22 is not performed in the stage of translation of the switching situation of the coupled state as described above is not excluded as well.

Figure 13:
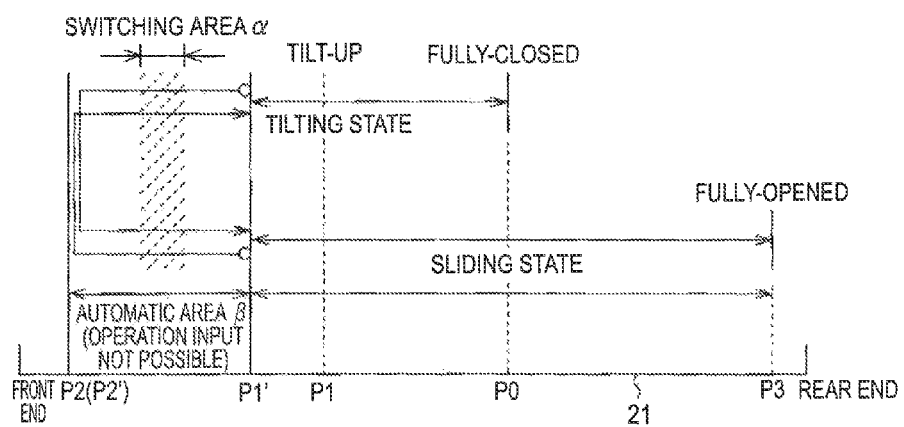
FIG. 13 is an explanatory drawing illustrating a control state of the opening and closing drive unit of another example.

For example, as illustrated in FIG. 13, an automatic area β including the switching area α is set at the forward position where the movable panel 10 is tilted up. The automatic area β preferably extends forward and backward of the switching area α in a form of including the switching area α. A rear end position P1' of the automatic area β may be set at a position forward of the position P1 at which the movable panel 10 is completely tilted up, and a front and position P2' of the automatic area β may be set to the position P2 at which the direction of movement of the movable bodies 22 is reversed. Then, a configuration in which the opening and closing drive being executed is not changed while the movable bodies 22 are within the automatic area β, and the both opening and closing drive units 20 are controlled automatically until the movable bodies 22 of the opening and closing drive units 20 leaves the automatic area β is applicable. In this configuration, an event in which the lodging occurs in the opening and closing drive units 20 may be avoided. Accordingly, the switching between the tilting state and the sliding state is achieved smoothly.

Subsequently, technical thoughts which can be understood from the embodiment described above and advantages thereof will be described.

(i) The vehicle sunroof apparatus wherein the control device executes recognition of the switching of the coupled state independently for each of the opening and closing drive units. Accordingly, the accuracy of the recognition of the switching may be enhanced.

A first aspect of this disclosure is directed to a vehicle sunroof apparatus including: a pair of first and second opening and closing drive units provided in a widthwise direction, the pair of first and second opening and closing drive units each including: a rail extending in a fore-and-aft direction of a vehicle; a movable body provided so as to be movable on the rail; and a coupling mechanism configured to couple the movable body to a movable panel provided in a roof opening portion, and arranged at widthwise both end portions of the roof opening portion so as to be capable of opening and closing the movable panel; and a control device configured to control operations of the opening and closing drive units, wherein the coupling mechanism includes a tilt mechanism configured to tilt the movable panel in accordance with a relative position of the movable body moving on the rail, and a switching mechanism configured to switch a state between a tilting state in which the movable body is relatively movable with respect to the movable panel and a sliding state in which the movable panel moves integrally with the movable body, the tilt mechanism is configured to tilt up the movable panel on the basis of a forward movement of the movable body, the switching mechanism is configured to switch a coupled state between the movable body and the movable panel in the tilting state into the sliding state and switch the coupled state in the sliding state into the tilting state with the movable body moved to a switching area set at a forward position where the movable panel is tilted up, and the control device is configured to detect a load variation caused by switching of the coupled state by the forward movement of the movable body in the switching area and control each of the opening and closing drive units so as to move the movable body reversely when the switching of the coupled state is recognized in the first and second opening and closing drive units on the basis of the load variation.

In other words, in a state in which the coupled state between the movable panel and the movable bodies is mechanically switched by the forward movement of the movable bodies in a switching area, a load is applied to the movable bodies moving on the rails when the coupled state is switched. Therefore, in the configuration as described above, the switching of the coupled state may be recognized easily in the opening and closing drive units by a simple configuration. In addition, by moving the movable bodies reversely when the switching of the coupled state is recognized in both of the opening and closing drive units, an occurrence of a situation that the coupled states of the left and right opening and closing drive units become different may be suppressed. Consequently, an occurrence of lodging in the opening and closing drive units is avoided, so that the switching between the tilting state and the sliding state is achieved smoothly.

A second aspect of this disclosure is directed to the vehicle sunroof apparatus described above, wherein the control device prohibits the stop and the reverse movement of the movable body until the switching of the coupled state is recognized in both of the left and right opening and closing drive units in a case where the switching of the coupled state is recognized in one of the opening and closing drive units on the basis of the load variation.

In other words, there arises a time-lag between timings of the switching of the coupled state between the opening and closing drive units in many cases. In a situation in which the coupled state of only one of the opening and closing drive units is switched, the opening and closing drive units is subjected to lodging due to the coupled states different from each other between the left and the right. Therefore, according to the configuration described above, an event that the state in which the lodging occurs in the opening and closing drive units may be avoided. Accordingly, the switching between the tilting state and the sliding state is achieved smoothly.

A third aspect of this disclosure is directed to the vehicle sunroof apparatus described above, wherein the movable body of each of the opening and closing drive units moves on the rail by being driven by a motor, and the control device is configured to detect the load variation caused by the switching of the coupled state on the basis of a change of a pulse signal synchronous with the rotation of the motor.

A fourth aspect of this disclosure is directed to the vehicle sunroof apparatus described above, wherein the movable body of each of the opening and closing drive units moves on the rail by being driven by the motor, and the control device is configured to detect the load variation caused by the switching of the coupled state on the basis of a change of the current amount supplied to the motor.

A fifth aspect of this disclosure is directed to the vehicle sunroof apparatus described above, wherein the control device is configured to detect the load variation caused by the switching of the coupled state on the basis of a change of the speed of the movable body moving on the rail.

In the configurations described above, an occurrence of the load variation may be detected easily.

A sixth aspect of this disclosure is directed to the vehicle sunroof apparatus described above, wherein the switching mechanism includes first and second coupling members configured to move relative to each other by the movement of the movable body in the switching area, and the coupled state between the movable body and the movable panel is switched by coupling and decoupling between the first and second coupling members, the first coupling member includes a rotating cam having a rotating shaft extending in the direction of relative movement with respect to the second coupling member and rotatably supported thereby, the second coupling member is made of a through hole which allows insertion of the rotation cam by the forward movement of the movable body in the switching area, and a cam surface configured to come into abutment with the rotating cam inserted into the through hole to cause the rotating cam to rotate, and the cam surface is configured to change a rotational position of the rotating cam in abutment with the cam surface from the through hole to the position at which a disconnection from the through hole is not possible by being inserted into the through hole, and is configured to change the rotating position from the position at which the disconnection is not possible to a position at which the disconnection is possible when the rotating cam at the rotational position at which the disconnection is not possible comes into abutment with the cam surface again by the forward movement of the movable body in the switching area.

In other words, in a configuration having the switching device as described above, the rotating cam of the first coupling member and the cam surface of the second coupling member push each other while the movable body moves forward even after the coupled state with respect to the movable panel is switched. A pressing force generated between the rotating cam and the cam surface acts on the movable body as a load. Therefore, according to the configuration described above, the switching of the coupled state may be recognized in the opening and closing drive units with higher degree of accuracy on the basis of the load variation caused by the switching of the coupled state.

A seventh aspect of this disclosure is directed to the vehicle sunroof apparatus described above, wherein the movable body includes a first movable body provided on the first opening and closing drive unit and a second movable body provided on the second opening and closing drive unit, the first movable body is configured to move on the rail by being driven by a first motor; the second movable body is configured to move on the rail by being driven by a second motor different from the first motor, and the control device is configured to detect the load variation caused by switching of the coupled state of the first opening and closing drive unit on the basis of the change of the pulse signal synchronous with the rotation of the first motor, and detect the load variation caused by the switching of the coupled state of the second opening and closing drive unit on the basis of the change of the pulse signal synchronous with the rotation of the second motor.

In other words, by recognizing the switching of the coupled states of the opening and closing drive units independently in this manner, the accuracy of the recognition of the switching may be enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle sunroof apparatus comprising:
a pair of first and second opening and closing drive units provided in a widthwise direction, the pair of first and second opening and closing drive units each including: a rail extending in a fore-and-aft direction of a vehicle; a movable body provided so as to be movable on the rail; and a coupling mechanism configured to couple the movable body to a movable panel provided in a roof opening portion, and arranged at widthwise both end portions of the roof opening portion so as to be capable of opening and closing the movable panel; and
a control device configured to control operations of the opening and closing drive units, wherein
the coupling mechanism includes a tilt mechanism configured to tilt the movable panel in accordance with a relative position of the movable body moving on the rail, and a switching mechanism configured to switch a state between a tilting state in which the movable body is relatively movable with respect to the movable panel and a sliding state in which the movable panel moves integrally with the movable body,
the tilt mechanism is configured to tilt up the movable panel on the basis of a forward movement of the movable body,
the switching mechanism is configured to switch a coupled state between the movable body and the movable panel in the tilting state into the sliding state and switch the coupled state in the sliding state into the tilting state with the movable body moved to a switching area set at a forward position where the movable panel is tilted up, and the control device is configured to detect a load variation caused by switching of the coupled state by the forward movement of the movable body in the switching area and control each of the opening and closing drive units so as to move the movable body reversely when the switching of the coupled state is recognized in the first and second opening and closing drive units on the basis of the load variation.

2. The vehicle sunroof apparatus according to claim 1, wherein
the control device prohibits the stop and the reverse movement of the movable body until the switching of the coupled state is recognized in both of the left and right opening and closing drive units in a case where the switching of the coupled state is recognized in one of the opening and closing drive units on the basis of the load variation.

3. The vehicle sunroof apparatus according to claim 1, wherein
the movable body of each of the opening and closing drive units moves on the rail by being driven by a motor, and
the control device is configured to detect the load variation caused by the switching of the coupled state on the basis of a change of a pulse signal synchronous with the rotation of the motor.

4. The vehicle sunroof apparatus according to claim 1, wherein
the movable body of each of the opening and closing drive units moves on the rail by being driven by the motor, and
the control device is configured to detect the load variation caused by the switching of the coupled state on the basis of a change of the current amount supplied to the motor.

5. The vehicle sunroof apparatus according to claim 1, wherein
the control device is configured to detect the load variation caused by the switching of the coupled state on the basis of a change of the speed of the movable body moving on the rail.

6. The vehicle sunroof apparatus according to claim 1, wherein
the switching mechanism includes first and second coupling members configured to move relative to each other by the movement of the movable body in the switching area, and the coupled state between the movable body and the movable panel is switched by coupling and decoupling between the first and second coupling members, the first coupling member includes a rotating cam having a rotating shaft extending in the direction of relative movement with respect to the second coupling member and rotatably supported thereby, the second coupling member is made of a through hole which allows insertion of the rotating cam by the forward movement of the movable body in the switching area, and a cam surface configured to come into abutment with the rotating cam inserted into the through hole to cause the rotating cam to rotate, and the cam surface is configured to change a rotational position of the rotating cam in abutment with the cam surface from the through hole to the position at which a disconnection from the through hole is not possible by being inserted into the through hole, and is configured to change the rotating position from the position at which the disconnection is not possible to a position at which the disconnection is possible when the rotating cam at the rotational position at which the disconnection is not possible comes into abutment with the cam surface again by the forward movement of the movable body in the switching area.

7. The vehicle sunroof apparatus according to claim 1, wherein the movable body includes a first movable body provided on the first opening and closing drive unit and a second movable body provided on the second opening and closing drive unit, the first movable body is configured to move on the rail by being driven by a first motor;

the second movable body is configured to move on the rail by being driven by a second motor different from the first motor, and the control device is configured to detect the load variation caused by switching of the coupled state of the first opening and closing drive unit on the basis of the change of the pulse signal synchronous with the rotation of the first motor, and detect the load variation caused by the switching of the coupled state of the second opening and closing drive unit on the basis of the change of the pulse signal synchronous with the rotation of the second motor.

* * * * *